United States Patent Office 3,432,481
Patented Mar. 11, 1969

3,432,481
HYDROGENATION PROCESS
William O. Webber, Baytown, Tex., assignor to Esso Research and Engineering Company, a corporation of Delaware
No Drawing. Filed June 27, 1966, Ser. No. 560,884
U.S. Cl. 260—82
Int. Cl. C08f 27/25, 15/42
6 Claims The present invention relates to a process for hydrogenating petroleum resins. More particularly, the present invention relates to a method for improving the color of hydrogenated petroleum resins. In its most specific aspects, the present invention relates to the liquid phase catalytic hydrogenation of petroleum resins, wherein a soluble amount of water or ammonium hydroxide is added to the feedstock being admitted to the hydrogenation reaction, whereby the color of the hydrogenated petroleum resin product is improved.

Petroleum resins are produced (as hereinafter more specifically described) from a steam-cracked naphtha by the aluminum chloride catalyzed polymerization of the $C_5$ to $C_8$ olefins produced in the cracking process. The petroleum resin product of polymerization is hydrogenated to saturate any unreacted olefins and diolefins which may still be present, as well as to hydrogenate the double bonds and organic chlorides and oxides present in the polymer chain. Hydrogenation of the petroleum resin improves the color and stability of the resin product and tends to reduce the softening point by reducing molecular weight via cracking. This latter effect is highly undesirable. Unhydrogenated resins are highly colored, the color ranging from a light amber color to an opaque dark brown or black. It is desirable to improve the color of the material so that it is a transparent straw-colored material.

It has been found in one aspect of the present invention that the color of the hydrogenated petroleum resin can be improved by the addition of water into the feedstock to the hydrogenation zone. However, the addition of water (particularly in amounts sufficient to form a separate phase) presents the danger of forming hydrochloric acid if the feedstocks contain organic chlorides (which leads to severe corrosion), and to the softening and disintegration of the catalyst pellets in the reaction zone. It has been found, however, that if water is injected either as such or as ammonium hydroxide (or as aqueous ammonium hydroxide), the amounts being limited to those which are soluble in the liquid hydrocarbon phase during hydrogenation under the conditions chosen for hydrogenation, the benefit of color improvement can be obtained without undue corrosion or catalyst degradation. When ammonium hydroxide is employed, a reduction in the amount of losses of yield to hydrocracking is also obtained (which reduction is attributable to the presence of ammonia released by decomposition of the ammonium hydroxide).

Another advantage of aqueous $NH_4QH$ injection is that in some cases it can be used as the neutralizing step and thereby eliminate the subsequent water-washing step.

The production of petroleum resins by the polymerization of the olefins and diolefins produced by steam cracking of naphtha and other distillates is well known in the art. For example, in U.S. Patent 2,035,233, Hochwalt describes the aluminum chloride catalyzed polymerization of the cracked products obtained from a natural gas distillate. Hochwalt neutralizes the reaction products, after removal from the reaction zone, by reaction with water soluble alkalies such as ammonium hydroxide. The ammonium hydroxide is employed to remove aluminum chloride catalyst from the product.

U.S. Patent 2,846,419, issued to Moak, also discloses the production of petroleum resins. Moak treats the resin product by washing it with ammonium hydroxide and isopropyl alcohol. Neither Hochwalt nor Moak hydrogenates the product, nor introduces water or ammonium hydroxide into a hydrogenation zone.

As has been stated above, the petroleum resins of the present invention are well known products which are prepared by the polymerization of the olefins and diolefins contained in a cracked naphtha product. For example, liquid petroleum fractions, such as naphtha, kerosene, gas oil, residual oil, natural gas distillates, and the like, are cracked at relatively low pressures and temperatures of 1000° to 1500° F. in the presence of steam and for relatively short contact times. The gas and liquid streams produced contain large quantities of diolefins and olefins, particularly in the $C_5$ to $C_{12}$ range. The naphtha distillate stream is obtained by steam cracking operations, contains large amounts of diolefins, olefins, aromatics and some paraffins and naphthenes. A typical cracked product contains 20% diolefins, 51% olefins, 21% aromatics, and 2% paraffins and naphthenes.

In the production of resins, these cracked naphtha distillates are treated with 0.25 to 2.5% of a Friedel-Crafts-type catalyst, such as aluminum chloride, aluminum bromide, boron trifluoride and the like. The reactions are conducted at temperatures in the range of $-50°$ to $+100°$ C. (preferably $-35°$ to $+75°$ C.). The product is a substantially nonaromatic, unsaturated hydrocarbon resin, having a color from light amber to dark brown or black, depending on the starting materials and other factors. The resulting petroleum resin exhibits a molecular weight between 1000 and 2000 and contains from 1 to 3 double bonds per molecule, from 200 to 500 p.p.m. sulfur, from 200 to 1000 p.p.m. chlorides, and from 0.1 to 2% oxygen.

The resin is hydrogenated in the presence of a hydrocarbon solvent, such as isoparaffinic solvents, alkylate or any paraffin boiling narrowly or widely in the range from 150° to 550° F. Suitably, the volume ratio of resin to solvent will range from 1:1 to about 10:1 volume percent. A typical solvent is Isopar L, the properties of which are shown in Table I below.

TABLE I.—ISOPAR L—SPECIFICATION PROPERTIES

| | Min. | Max. | Test Method |
|---|---|---|---|
| Gravity, ° API 60/60° F | 52.5 | 54.5 | ASTM D 287. |
| Color, Saybolt | 30 | | ASTM D 156. |
| Aniline point, ° F | 183 | | ASTM D 611. |
| Sulfur, p.p.m | | 10 | ASTM D 1266. (Nephelometric mod.) |
| Distillation, ° F.: | | | |
| I.B.P | 370 | 380 | |
| 50% | 378 | 385 | ASTM D 86 |
| Dry point | 400 | 410 | |
| F.B.P | | 415 | |

ISOPAR L—TYPICAL PROPERTIES

Solvency:
  Aniline point, ° F. (ASTM D 611) _____ 187
  Solubility parameter (Burrell) [1] _____ 7.3
  Kauri-butanol value _____ 27
Volatility Distillation (ASTM D 86), ° F.:
  I.B.P _____ 373
  5% _____ 375
  10% _____ 376
  50% _____ 381
  90% _____ 393
  95% _____ 400

[1] Federation of Societies for Paint Technology, Official Digest, October 1955, p. 726.

The hydrogenation reaction is carried out in the presence of a suitable hydrogenation catalyst, a number of which are well known in the art. For example, nickel supported on kieselguhr is an excellent hydrogenation catalyst. Other hydrogenation catalysts which are suitable for use in the present invention are nickel on alumina and pelletized nickel-aluminum alloy.

The hydrogenation reaction is carried out in the liquid phase, the liquid hourly space velocity of the resin and solvent mixture being from 0.0005 to 0.005 barrels per pound of catalyst per hour.

The hydrogenation reaction may be carried out at a temperature from 300° to 550° F., and at a pressure from 300 to 3000 p.s.i.g. The hydrogen treat rate may range from 200 to 3000 s.c.f./bbl., based upon the hydrogen in the treat stream. Hydrogen purity may range from 50 to 100%.

Preferably, the process will utilize Isopar L (see Table I) as a solvent, with 25% resin in the solution, will employ nickel on kieselguhr as a catalyst with an LHSV of about 0.002 bbl./hr./lb. catalyst. The preferred temperature will be 400° F. at a pressure of 1800 p.s.i.g., using a hydrogen treat rate of 500 s.c.f./bbl. at a hydrogen purity of 75%.

The hydrogenation reaction, as above set forth, is well known to those skilled in the art. The present invention contemplates admixing with the feedstock to the hydrogenation zone from 0.1 to 50.0 weight percent of water or ammonium hydroxide (based on resin plus solvent). The amount of water or ammonium hydroxide to be added in no event is to exceed the solubility of the ammonium hydroxide in the liquid phase under the reaction conditions chosen. The concentration as well as the solubility are measured by reference to the resin-solvent mixture. The $NH_4OH$ may be aqueous; that is, it may contain small amounts of water in excess of that which is reacted with the $NH_3$ to form $NH_4OH$. The concentration of $NH_4OH$ in the aqueous ammonium hydroxide can be from 1.0 to 100 weight percent. As used herein, the term "ammonium hydroxide" shall be deemed to include "aqueous ammonium hydroxide."

Example

In order to illustrate the present invention, the following example is given. A petroleum resin obtained by Friedel-Crafts polymerization of steam-cracked naphtha was hydrogenated in Isopar L (containing some alkylate) as a solvent. The solvent contained 30 weight percent petroleum resin dissolved therein. The resin solution was charged at a rate of 100 bbl./day. The resin solution was contacted with a bed of nickel on kieselguhr catalyst at an LHSV of 0.002. The reaction conditions included a hydrogen treat rate of 1000 s.c.f./bbl., a temperature of 500° F., and a pressure of 1000 p.s.i.g. Variations in the LHSV resulted in a residence time between 1 and 4 hours.

Water was injected into the feed stream to the hydrogenation reactors at a rate of about 2.0%, based on resin plus solvent. The solubility of water in the liquid phase under the reaction conditions was about 0.5%. The effect of the water injection is shown in the following table.

TABLE II

| | A Before Water Injection | B After Water Injection | Effect of Water B-A |
|---|---|---|---|
| Time | 6:00 a.m. | 8:00 a.m. | |
| Color: | | | |
| Klett | 77 | 39 | −38 |
| Gardner | 1.6 | 0.9 | −0.7 |
| Gardner, 15 hrs | 9.8 | 9.0 | −0.8 |
| UV, as is | 34 | 18 | −16 |
| UV, 15 hrs | 766 | 629 | −137 |
| Softening Point, °C | 101.6 | 101.6 | 0 |
| Reactor Temperature Rise, °F | 18 | 18 | 0 |

As can be seen from Table II, the Klett color improved from 77 to 39 and the Gardner color improved from 1.6 to 0.9 with no loss in softening point. Note also that the 15-hour Gardner color was improved from 9.8 to 9.0 and the ultraviolet adsorption showed also a definite color improvement. No deleterious change in the softening point was suffered during the short time during which the water was injected, and no change in the reactor temperature rise was noted. For continuous operation, however, the amount of water should be not greater than its solubility in the reaction mass.

Having disclosed the invention and a specific preferred manner in which it is to be carried out, what is desired to be covered by Letters Patent should be limited not by the specific examples herein given, but rather by the appended claims.

I claim:

1. In the liquid phase catalytic hydrogenation of petroleum resins in a hydrocarbon solvent,
   the improvement of adding water or ammonium hydroxide in amounts, based on resin plus solvent, between 0.1 and 50.0 weight percent but not in excess of the solubility of said water or ammonium hydroxide in the petroleum resins and hydrocarbon solvent under the reaction conditions employed for hydrogenation,
whereby the color of the hydrogenated petroleum resin product is improved.

2. A process in accordance with claim 1 wherein the hydrogenation catalyst is nickel or kieselguhr.

3. A process in accordance with claim 2 wherein the reaction temperature is from 300° to 550° F., the reaction pressure is from 300 to 3000 p.s.i.g., the space velocity is from 0.0005 to 0.005 bbls./lb./hr., and the hydrogen treat rate is from 200 to 3000 s.c.f./bbl.

4. A process in accordance with claim 1 wherein the petroleum resins are: 1000 to 2000 molecular weight, contain 1 to 3 double bonds per molecule, 200 to 500 p.p.m. sulfur, 200 to 1000 p.p.m. chlorides and 0.1 to 2% oxygen, and the ratio of petroleum resin to hydrocarbon solvent is 1:1 to 1:10 bbl./bbl.

5. A method in accordance with claim 1 wherein ammonium hydroxide is added to the hydrogenation zone.

6. A method in accordance with claim 5 wherein the ammonium hydroxide contains from 1.0 to 100 weight percent $NH_4OH$, the balance being water.

References Cited

UNITED STATES PATENTS

| 2,039,365 | 5/1936 | Thomas | 260—82 |
| 2,062,845 | 12/1936 | Thomas | 260—82 |
| 2,824,860 | 2/1958 | Aldridge | 260—82 |
| 2,963,467 | 12/1960 | Small | 260—82 |

JAMES A. SEIDLECK, *Primary Examiner.*

U.S. Cl. X.R.

260—96